United States Patent
Schiff (10) Patent No.: US 6,671,250 B1
(45) Date of Patent: Dec. 30, 2003

(54) METHOD FOR DEEP PAGING

(75) Inventor: Leonard N. Schiff, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/376,822

(22) Filed: Aug. 17, 1999

(51) Int. Cl.$^7$ .................................................. H04J 11/00
(52) U.S. Cl. ....................... 370/209; 370/335; 370/342; 370/441
(58) Field of Search ................................ 370/309, 313, 370/328, 329, 335, 342; 455/3.01, 3.02, 422, 427, 430, 434, 456

(56) References Cited

U.S. PATENT DOCUMENTS

| | | | |
|---|---|---|---|
| 4,901,307 A | | 2/1990 | Gilhousen et al. |
| 5,261,118 A | * | 11/1993 | Vanderspool et al. ........ 455/12.1 |
| 5,659,545 A | | 8/1997 | Sowles et al. |
| 5,691,974 A | | 11/1997 | Zehavi et al. |
| 5,742,908 A | | 4/1998 | Dent |
| 5,936,570 A | | 8/1999 | Ghazvinian et al. |
| 6,111,865 A | * | 8/2000 | Butler et al. ................ 370/335 |
| 6,381,235 B1 | * | 4/2002 | Kamel et al. ............... 370/342 |
| 6,421,540 B1 | * | 7/2002 | Gilhousen et al. .......... 455/458 |
| 6,456,858 B1 | * | 9/2002 | Streter ........................ 455/552 |

FOREIGN PATENT DOCUMENTS

| | | |
|---|---|---|
| EP | 0776100 A | 5/1997 |
| EP | 0848506 A | 6/1998 |
| EP | 0901240 A | 3/1999 |
| WO | 9832290 | 7/1998 |

* cited by examiner

*Primary Examiner*—Hassan Kizou
*Assistant Examiner*—David Odland
(74) *Attorney, Agent, or Firm*—William M. Hooks; Christopher Edwards (57) ABSTRACT

A method for deep paging in a communication system employing orthogonal channelizing codes, such as Walsh sequences, of predetermined length m, that does not require a high powered paging channel. The method includes the steps of generating a paging channel message which is combined with a Walsh sequence having a length greater than or equal to 2m, and transmitting the paging channel message at a data rate of less than 4800 bits per second (bps). By transmitting the paging channel message at a low data rate and integrating collected energy over a period longer by a factor on the order of 1000, the message is able to penetrate buildings and other structures or high attenuation environments, thereby allowing one to successfully page a user terminal that is inside such a structure or area. Preferably, the paging channel message is formed using an auxiliary Walsh sequence on the order of 65536 chips in length, and the data rate is less than 10 bps.

18 Claims, 6 Drawing Sheets

METHOD FOR DEEP PAGING

BACKGROUND OF THE INVENTION

1. Field of the Invention

The present invention relates generally to satellite and other communication systems subject to severe path loss, and more specifically, to a method of providing paging signals, referred to as deep paging, which results in paging signals that are receivable in the presence of high levels of attenuation.

2. Related Art

Conventional satellite-based communication systems include gateways, user terminals, and one or more satellites to relay communication signals between the gateways and the user terminals. A gateway is an earth station having an antenna for transmitting signals to and receiving signals from satellites. A gateway provides communication links, using satellites, for connecting a user terminal to other user terminals or users of other communication systems, such as a public switched telephone network. A user terminal is a wireless communication device such as, but not limited to, a cellular or satellite telephone, a data transceiver, and a paging receiver. A user terminal can be fixed, portable, or mobile, such as a mobile telephone. A satellite is an orbiting receiver, repeater, and regenerator used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same specific geographic region.

Some satellite communications systems employ code division multiple access (CDMA) spread-spectrum signals, as disclosed in U.S. Pat. No. 4,901,307, issued Feb. 13, 1990, entitled *"Spread Spectrum Multiple Access Communication System Using Satellite or Terrestrial Repeaters,"* and U.S. Pat. No. 5,691,974, which issued Nov. 25, 1997, entitled *"Method and Apparatus for Using Full Spectrum Transmitted Power in a Spread Spectrum Communication System for Tracking Individual Recipient Phase Time and Energy,"* both of which are assigned to the assignee of the present invention, and are incorporated herein by reference.

In satellite communication systems employing CDMA, separate communication links are used to transmit communication signals, such as data or traffic, to and from a gateway. Specifically, communication signals originating at the gateway are transmitted to a user terminal over a "forward communication link," whereas, communication signals originating at a user terminal are transmitted to the gateway over a "reverse communication link."

On the forward communication link, information is transmitted from a gateway to a user terminal over one or more beams. These beams often comprise a number of so-called subbeams (also referred to as frequency division multiple access (FDMA) channels, or in the case of spread spectrum CDMA channels) covering a common geographic area, each occupying a different frequency band. More specifically, in a conventional spread-spectrum communication system, one or more preselected pseudorandom noise (PN) code sequences are used to modulate or "spread" user information signals over a predetermined spectral band prior to modulation onto a carrier signal for transmission as communication signals. PN spreading is a method of spread-spectrum transmission that is well known in the art, and produces a communication signal with a bandwidth much greater than that of the data signal. On the forward link, PN spreading codes or binary sequences are used to discriminate between signals transmitted by different gateways or over different beams, as well as between multipath signals. These codes are often shared by all communication signals within a given subbeam.

In a conventional CDMA spread-spectrum communication system, "channelizing" codes are used to form multiple channels within a satellite sub-beam on a forward link. The channelizing codes are unique 'covering' or 'channelizing' orthogonal codes that create orthogonal channels in a subbeam over which communication signals are transferred. Walsh functions are generally used to implement the channelizing codes, also known as Walsh codes or Walsh sequences, and create what are known as Walsh channels. A typical orthogonal code length is 64 code chips for terrestrial systems and 128 code chips for satellite systems.

A majority of the orthogonal channels are traffic channels that provide messaging between a user terminal and a gateway. The remaining channels often include a pilot channel, a sync channel, and one or more paging channels. Signals sent over the traffic channels are generally intended for reception by one user terminal, although messages can also be broadcast to multiple users. In contrast, paging, sync, and pilot channels are generally monitored by multiple user terminals.

When a user terminal is not involved in a communications session (that is, the user terminal is not receiving or transmitting traffic signals), the gateway can convey information to the user terminal by transmitting a page to the user terminal. The page, which is usually a short message, is transmitted over the above mentioned paging channel. Pages are often sent by the gateway to establish a communication link with a user terminal, to notify a user terminal that it is being called, to reply to a user terminal trying to access the system, and for user terminal registration. Pages are also used to distribute traffic channel assignments and system overhead information to user terminals. Pages transmitted over the paging channel typically have a data rate on the order of 9600 or 4800 bits per second.

Unfortunately, a user terminal typically encounters problems receiving pages when the user terminal is inside a building or there is some structure or other obstruction positioned between the user terminal and the satellite (such as a tree, geological object, or a building). In such a situation, the user terminal is unable to acquire a page, paging message, or paging signal because the page is unable to penetrate the building or other material due to a propagation loss of the signal as it propagates through the structure. An obvious solution to overcome the propagation loss is to increase the power of the paging channel. The problem with this approach is that in order to overcome such signal attenuation or blockage the power of the paging channel has to be increased significantly. Generally, this requires increasing the signal strength to such a level that a power flux density (PFD) limit would be exceeded in the surrounding area. That is, governmental licensing restrictions and technical constraints place limits as to the allowed amount of power flux density satellite signals can have over a given area or geographical region. Increasing the power to successfully page a blocked or impeded user terminal, places the surrounding area over the allowed power flux density (PFD).

What is needed, therefore, is a method that can provide what will be called "deep paging" without increasing the power of the paging signal. Deep paging refers to being able to page a user terminal in an environment where there is an excess propagation loss to be overcome, a loss much higher than normally encountered, which is typically on the order of 20 or 30 dB. Such an environment includes a situation where a user terminal is located deeply inside a building or structure, or behind a partial obstruction.

SUMMARY OF THE INVENTION

The present invention provides a method for deep or highly penetrative paging that does not require increasing the power of the paging signal. In one aspect, the invention provides a method for deep paging that includes the steps of generating a paging channel message, covering or modulating the paging channel message with an orthogonal code sequence, preferably a Walsh code sequence, having a length greater than or equal to 2m code chips, where m is the length of code sequences typically used for generating traffic channels, and transmitting the modulated paging channel message at a data rate of less than 4800 bits per second (bps). By transmitting the paging channel message at a low data rate, the message is able to penetrate buildings and other structures, thereby allowing a user terminal that is inside a building to be successfully paged. Preferably, the paging channel message is covered by a Walsh sequence of length 65536, the data rate is less than 10 bps, and the Walsh sequence is an auxiliary Walsh sequence.

The invention also provides a method for deep paging in a CDMA communication system where several orthogonal or Walsh code sequences are used to form several orthogonal channels. The method includes the steps of creating at least one auxiliary Walsh sequence from one of the plurality of Walsh sequences, generating a paging channel message, covering or channelizing the paging channel message with the auxiliary Walsh sequence, spreading the channelized paging channel message, and transmitting the spread paging channel message at a data rate of less than 4800 bps. The auxiliary Walsh sequence has a length greater than or equal to 128 chips, but preferably the auxiliary Walsh sequence is of length 65536 chips. Further, preferably, the data rate is less than 10 bps. Advantageously, the method further includes the step of creating a second auxiliary Walsh sequence from one of the plurality of Walsh sequences and covering or modulating a synchronization signal with the second auxiliary Walsh sequence, to create an auxiliary synchronization channel. Additional auxiliary Walsh sequences can be created from one or more of the Walsh sequences and used to cover or modulate additional pilot, synchronization, or paging signals.

The invention also provides a method for compensating for the Doppler effect in a communication system where messages are transmitted at a low data rate to a user terminal that is inside a building or otherwise obstructed. The method includes the steps of having the user terminal acquire a pilot signal prior to the user terminal entering the building, placing the user terminal into a deep paging mode after the user terminal has acquired the pilot signal, proceeding into the building with the user terminal, tracking Doppler as the user terminal proceeds into the building, enter a longer signal integration mode, and monitoring an auxiliary paging channel after activating the deep paging mode. Paging channel messages transmitted over the auxiliary paging channel are modulated by a Walsh sequence having a length greater than or equal to 2m chips, where m is the length of the code used to normally modulate traffic channel signals, and are transmitted at a data rate of less than 4800 bps. Preferably, the paging channel messages transmitted over the auxiliary paging channel are formed using a Walsh sequence having a length of about 65536, and are transmitted at a data rate of 10 bps or less.

The invention also provides an alternative method for compensating for the Doppler effect in a communication system where messages are transmitted at a low data rate to a user terminal that is inside a building or otherwise obstructed. The alternative method includes the steps of receiving ephemeris messages transmitted from a gateway at the user terminal, storing the ephemeris messages or data contained therein in the user terminal, determining the location of the user terminal, determining Doppler based on the determined location of the user terminal and the ephemeris messages stored in the user terminal, and acquiring a pilot signal. In a first embodiment, the step of determining the location of the user terminal includes the steps of storing the location of the user terminal each time the user terminal registers with a gateway and determining the current location of the user terminal based on the location of the user terminal at the time the user terminal last registered with a gateway. In a second embodiment, the step of determining the location of the user terminal includes the steps of receiving a global positioning system (GPS), or other position location system, signal and determining the location of the user terminal based on the GPS signal.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

I. Introduction

The present invention is particularly suited for use in communications systems employing low Earth orbit (LEO) satellites, wherein the satellites are not stationary with respect to a point on the surface of the Earth. However, the invention is also applicable to non-LEO satellite systems, or systems in which relay devices or users have a high velocity relative to each other. The invention is also applicable to non-satellite communication systems in which there is a relatively high or significant propagation loss occurring between a transmitter and receiver.

A preferred embodiment of the invention is discussed in detail below. While specific steps, configurations and arrangements are discussed, it should be understood that this is done for illustrative purposes only. A preferred application is in CDMA wireless spread spectrum communication systems.

II. An Exemplary Satellite Communications System

A. Overview

Figure 1:
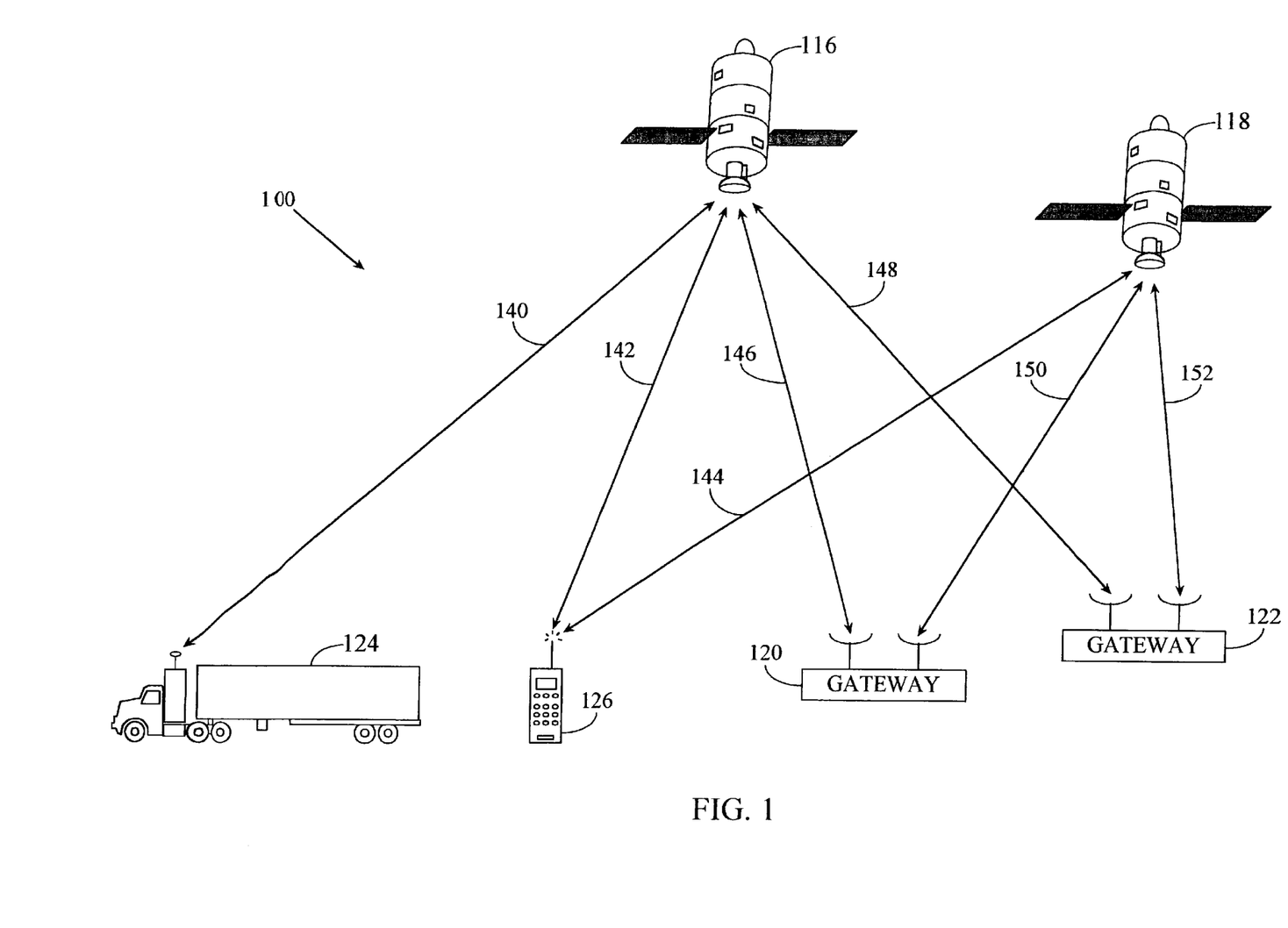
FIG. 1 illustrates an exemplary wireless communication system in which the present invention is useful.

An exemplary wireless communication system in which the present invention is useful is illustrated in FIG. 1. It is contemplated that this communication system uses CDMA type communication signals, which is not strictly required by the present invention as long as orthogonal codes are used to create unique channels for paging. In a portion of a communication system 100 illustrated in FIG. 1, two satellites 116 and 118, and two gateways or hubs 120 and 122 are shown for effecting communications with two remote user terminals 124 and 126. The total number of gateways and satellites in such systems depends on desired system capacity and other factors well understood in the art.

User terminals 124 and 126 each include a wireless communication device such as, but not limited to, a wireless telephone, a data transceiver, or a paging or position determination receiver, and can be hand-held or vehicle-mounted as desired. In FIG. 1, user terminal 124 is illustrated as a vehicle mounted device and user terminal 126 is illustrated as a hand-held telephone. However, it is also understood that the teachings of the invention are applicable to fixed units where remote wireless service is desired. User terminals are sometimes also referred to as subscriber units, mobile stations, mobile units, or simply as "users" or "subscribers" in some communication systems, depending on preference.

Generally, beams from satellites 116 and 118 cover different geographical areas in predefined beam patterns. Beams at different frequencies, also referred to as FDMA channels or "sub-beams," can be directed to overlap the same region. It is also readily understood by those skilled in the art that beam coverage or service areas for multiple satellites might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations.

In FIG. 1, some possible signal paths are illustrated for communications between user terminals 124 and 126 and gateways 120 and 122, through satellites 116 and 118. The satellite-user terminal communication links between satellites 116 and 118 and user terminals 124 and 126 are illustrated by lines 140, 142 and 144. The gateway-satellite communication links, between gateways 120 and 122 and satellites 116 and 118, are illustrated by lines 146, 148, 150 and 152. Gateways 120 and 122 may be used as part of one or two-way communication systems or simply to transfer messages or data to user terminals 124 and 126.

B. Exemplary user terminal transceiver

Figure 2:
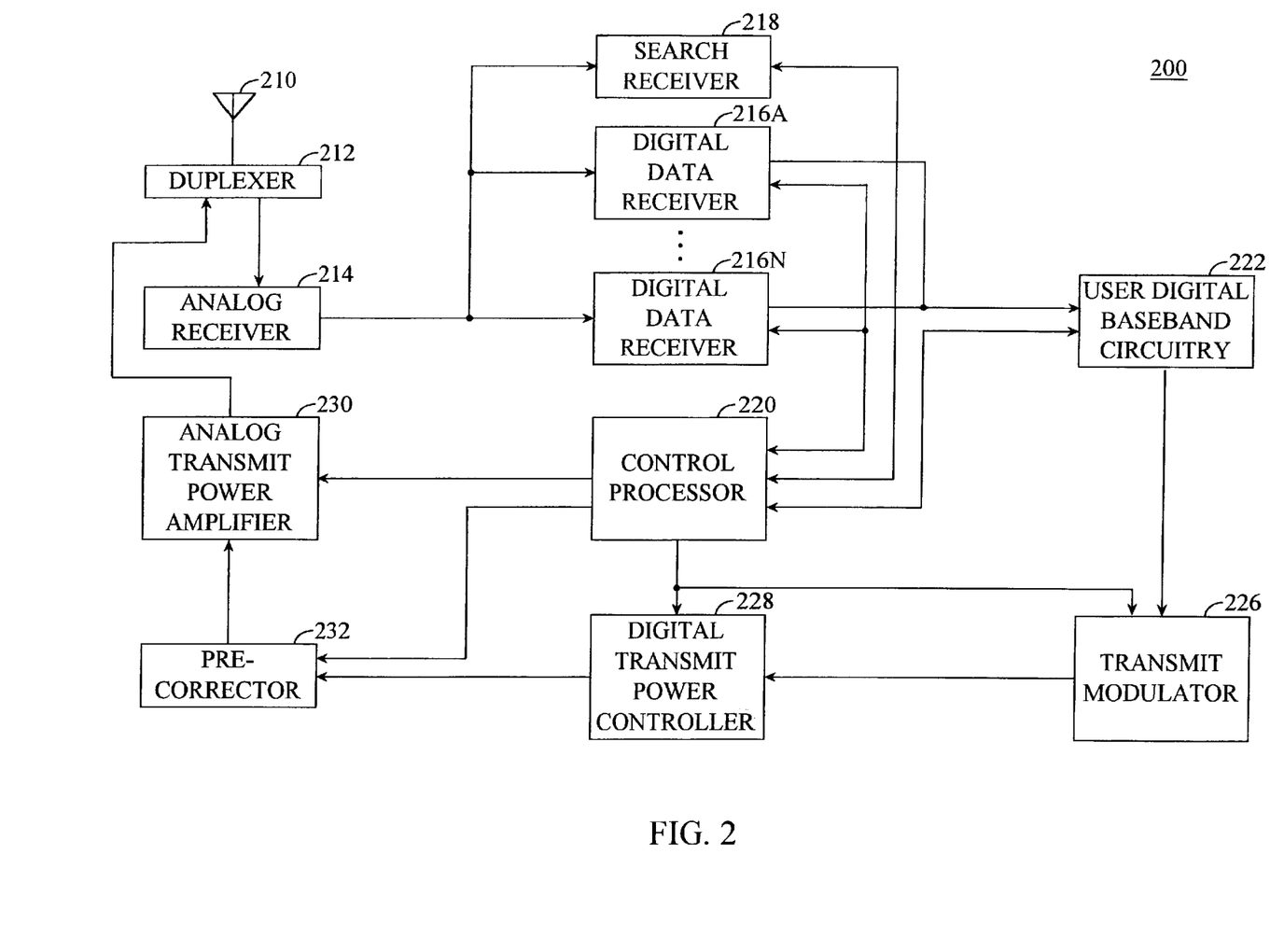
FIG. 2 illustrates an exemplary transceiver for use in a user terminal.

An exemplary transceiver 200 for use in user terminals 124 and 126 is illustrated in FIG. 2. Transceiver 200 uses at least one antenna 210 for receiving communication signals, which are transferred to an analog receiver 214, where they are down-converted, amplified, and digitized. A duplexer element 212 is often used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of transceiver complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and hand-off control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; and the like, all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Transceiver 200 can also employ a precorrection element 232 in the transmission path to adjust the frequency of the outgoing signal. This can be accomplished using well known techniques of up- or down-conversion of the transmission waveform. In the alternative, a precorrection element 232 can form part of a frequency selection or control mechanism for the analog up-conversion and modulation stage (230) of the user terminal so that an appropriately adjusted frequency is used to convert the digital signal to a desired transmission frequency in one step.

Transceiver 200 can also employ a precorrection element 232 in the transmission path to adjust the timing of the outgoing signal. This can be accomplished using well known techniques of adding or subtracting delay in the transmission waveform.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. However, a data receiver 216 can be assigned to track a pilot signal after acquisition to accurately determine a signal to noise ratio for chip signal energies for determining pilot signal strength. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Control processor 220 uses such information to determine to what extent the received signals are offset from the oscillator frequency, when scaled to the same frequency band, as appropriate. This and other information related to frequency errors and Doppler shifts, can be stored in a storage or memory element 236, as desired.

C. Exemplary gateway transceiver

Figure 3:
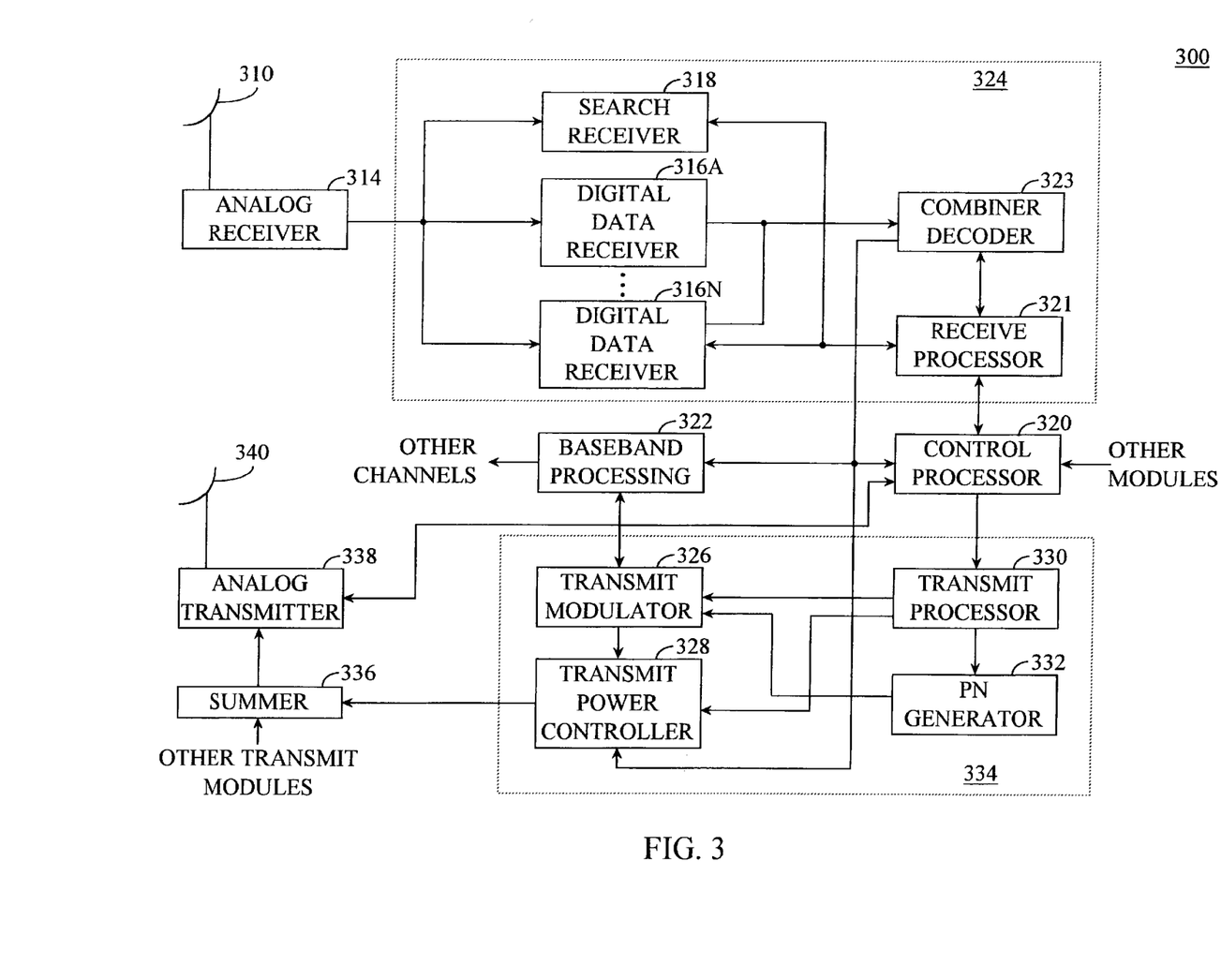
FIG. 3 illustrates exemplary transceiver apparatus for use in a gateway.

An exemplary transceiver apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one user terminal 124, 126, although certain variations are known in the art. One analog receiver 314 can provide inputs for many digital receiver modules 324, and a number of such modules are often used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A conventional gateway uses a number of such transmit modules 334 to provide service to many user terminals 124, 126 at a time, and for several satellites and beams at a time. The number of transmission modules 334 used by gateway 120, 122 is determined by factors well known in the art, including system complexity, number of satellites in view, user capacity, degree of diversity chosen, and the like.

Each transmit module 334 includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit modules. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in user communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type (pattern) or tone-type input to transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. If, as is usually the case, the Walsh code used is the all 0 code, this effectively results in transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, sync, paging signals, traffic channel signals, and any other channel signals and their respective coupling to power controller 328. Receiver processor 321 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information to control the timing and frequency of signals being transmitted and processed using transmit power controllers 328 and analog transmitter 338.

D. Exemplary communication links

Figure 4:
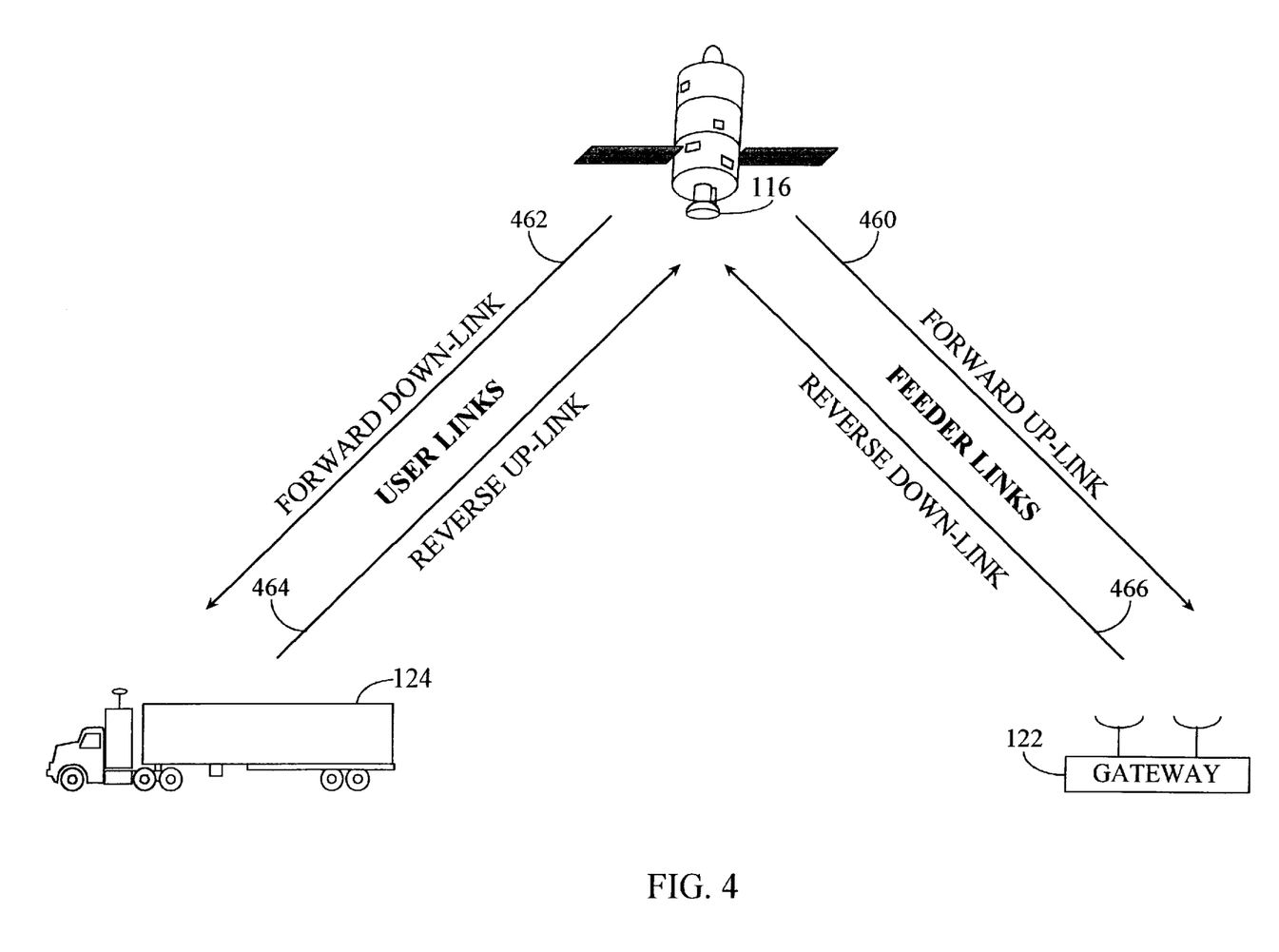
FIG. 4 illustrates exemplary communication links between a gateway and a user terminal.

FIG. 4 provides additional details of the communications between gateway 122 and user terminal 124 of communication system 100. Communication links between user terminal 124 and satellite 116 are generally termed user links and the links between gateway 122 and satellite 116 are generally termed feeder links. Communications proceeds in a "forward" direction from gateway 122 on forward feeder link 460 and then down from satellite 116 to user terminal 124 on forward user link 462. In a "return" or "reverse" direction, communication proceeds up from user terminal 124 to satellite 116 on reverse user link 464 and then down from satellite 116 to gateway 122 on reverse feeder link 466.

In an example embodiment, information is transmitted by gateway 122 on forward links 460, 462 utilizing frequency division and polarization multiplexing. The frequency band used is divided up into a predetermined number of frequency "beams." For example, the frequency band is divided into 8 individual 16.5 MHz "beams" using right hand circular polarization (RHCP) and 8 individual 16.5 MHz "beams" using left hand circular polarization (LHCP). These frequency "beams" are further made up of a predetermined number of frequency division multiplexed (FDM) "subbeams." For example, the individual 16.5 MHz beams may in turn be made up of up to 13 FDM "subbeams", each of 1.23 MHz bandwidth.

E. Exemplary Subbeam Structure

Figure 5:
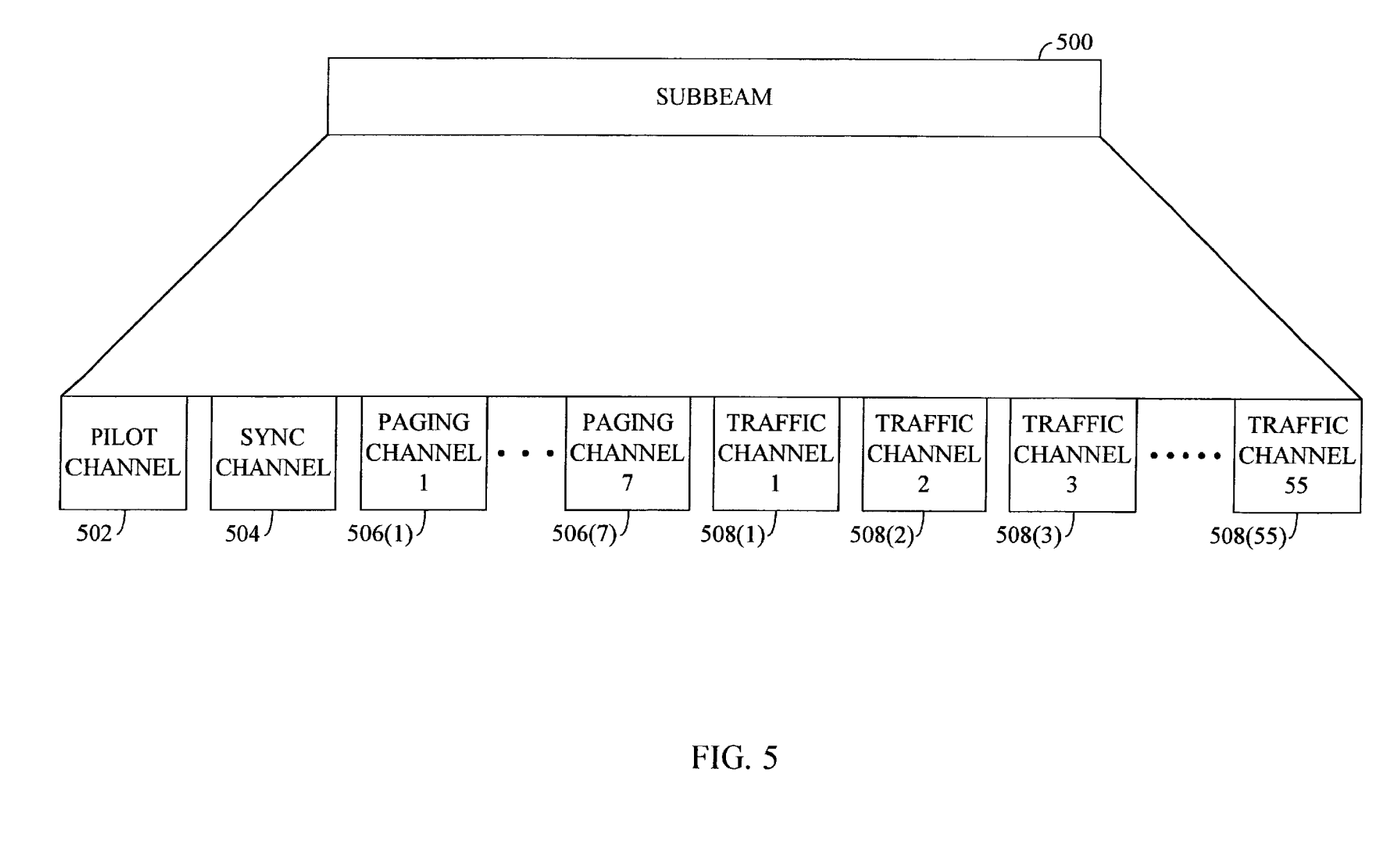
FIG. 5 illustrates an exemplary subbeam.

Each FDM subbeam can include multiple Walsh channels (also referred to as orthogonal channels). FIG. 5 illustrates an exemplary subbeam 500 having sixty-four Walsh channels 502–508. As shown in FIG. 5, exemplary subbeam 500 includes a pilot channel 502, a sync channel 504, seven paging channels 506(1)–(7), and fifty-five traffic channels 508(1)–(55) for a total of sixty-four orthogonal channels. Those skilled in the art will readily appreciate that other numbers of channels can be used, such as fewer or more paging channels, or a smaller or larger number of total channels. For example, some communication system designs call for using codes having 128 code chips or binary elements, resulting in 128 orthogonal channels, which would be $W_i^{128}$ in the below example.

Pilot channel 502 is used by user terminal 124 to, among other things, acquire a subbeam (CDMA carrier). Sync channel 504 includes a repeating sequence of information which user terminal 124 can read after acquiring pilot channel 502. This repeating sequence of information is used by user terminal 124 to acquire initial time synchronization, as is well known. Once user terminal 124 has acquired time synchronization, it adjusts its timing to correspond to what is commonly referred to as normal system timing. User terminal 124 then determines and begins monitoring one or more assigned paging channels 506 for paging channel messages transmitted from a gateway.

Paging channel messages convey information from a gateway to a user terminal. For purposes of the present example, there are at least five major types of paging channel messages. These major types of messages include: overhead messages, paging messages, order messages, channel assignment messages, and Short Message Services (SMS) messages. Overhead messages are used for configuring the system. Paging messages are usually sent when a gateway receives a call or request for or a link with a user terminal, and desires to obtain a response from the user terminal. Order messages are used to control a particular user terminal through transfer of commands to that terminal. For example, an order message can be used to lock or prevent an errant user terminal from transmitting. Channel assignment messages allow a gateway to change a paging channel assignment for a user terminal, and to assign a user terminal to one of the fifty five traffic channels 508. Finally, SMS messages allow gateways to convey short digital messages to a user terminal to present information to a user, such as by display on a screen for viewing. Such messages are used for visual paging messages much as in conventional pagers, to provide brief indications of system status, or other information including news, business, or sports data. Transfer of this type of message is an important consideration in deciding to implement a deep paging mode.

A traffic channel 508 is assigned when a communication link is requested (for example, when a call is being placed). Messaging between a user terminal and a gateway 122 during a conventional phone call is through a traffic channel 508.

Conventionally, the pilot channel 502, the sync channel 504, up to seven paging channels 506, and the fifty-five traffic channels 508 are each generated or formed using a set of unique orthogonal Walsh sequences denoted $W_i^{64}$ (where i is the index of the Walsh sequence and 64 is the sequence length, of general form $W_i^m$). Specifically, pilot channel 502 is usually formed using Walsh sequence $W_0^{64}$, a sync channel may be formed using Walsh sequence $W_1^{64}$, paging channels 506(1)–506(7) may be formed using Walsh sequences $W_2^{64}$–$W_8^{64}$, respectively, and traffic channels 508(1)–508(55) are formed using Walsh sequences $W_9^{64}$–$W_{63}^{64}$, respectively. Again, those skilled in the art will recognize that the teachings of the invention also apply to application of longer orthogonal codes such as $W_i^{128}$, which results in more channels being made available, and to sets of orthogonal binary codes that are not strictly defined as Walsh sequences.

Each of the unique Walsh sequences $W_0^{64}$–$W_{63}^{64}$ are orthogonal to each other. To transmit data on a particular Walsh channel, the data is covered or channelized by, that is, combined with or modulated using, the Walsh sequence used in forming that particular Walsh channel. For example, to transmit a page or paging information or data over paging channel 506(1), the page is first covered or channelized using Walsh sequence $W_2^{64}$. Likewise, to transmit traffic over traffic channel 508(3), the traffic must first be covered by Walsh sequence $W_{11}^{64}$, and so forth for each respective channel. A pilot channel 502 is covered by Walsh sequence $W_0^{64}$, which effectively provides no modulation.

III. Preferred Embodiment of the Invention

A preferred embodiment of the present invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination.

As discussed above, a user terminal encounters problems receiving paging channel messages when the user terminal is inside a building and not near an exterior opening such as a door or window, or otherwise covered or surrounded by a structure or physical material or objects, such as trees, that tend to block or attenuate signals. In such a situation, there is typically at least a 20 to 30 dB signal attenuation. One solution already discussed is to simply increase the power of one of the paging channels 506, such as paging channel 506(1) and have user terminals monitor that paging channel on a predetermined basis. The problem with this approach is that the power would have to be increased to such an extent that PFD limits would be exceeded, which is unacceptable.

A preferred solution is to decrease the data rate of one of the paging channels 506, for example paging channel 506(1), from its conventional data rate (4800 bps or 9600 bps) to a very low data rate (for example, 10 bps or less) while maintaining the conventional power level. At the same time, the integration period used for receiving such a paging signal is increased to allow collection of additional signal energy. This enables paging channel 506(1) to successfully deliver several tens of paging channel messages per hour to a user terminal in a location, such as a building, where the excess propagation loss that has to be overcome is in the range of 20 to 30 dB. Furthermore, this enables the bulk of the power of the subbeam 500 to be used for traffic channels 508.

The solution of using a very low data rate on one of the paging channels such as paging channel 506(1), however, requires using one of the orthogonal codes or Walsh sequences assigned to that channel. In order to maintain system capacity and not lose the use of a paging channel for a limited number of users within high attenuation coverage areas, a novel approach was adopted of using a much longer orthogonal code than that which is conventionally employed in forming a paging channel. As discussed above, paging channels 506(1)–506(7), and each of the other Walsh channels that form subbeam 500, are conventionally formed using a set of Walsh sequences, each having a length 'm' of sixty-four (64) chips, or one hundred and twenty-eight (128) chips. Such a code sequence length can be used for deep paging, and the code will remain orthogonal to the other channel codes, which may find application in some communication systems.

However, there is generally a desire to either provide, or plan for dynamic expansion to, multiple deep paging channels, for use in service areas where a larger number of user terminals are expected to encounter increased attenuation, making multiple channels useful for paging such numbers of users. In this situation or configuration, allocating code resources to multiple channels, for example to provide 5 deep paging channels, would use up multiple ones, here 5, of the total 64 or 128 Walsh or orthogonal codes used for the channels. This would ultimately sacrifice system capacity for other paging channels or traffic channels. But if one uses multiple auxiliary Walsh codes to form the deep paging channels, all derived from the same "root" Walsh code, then only one Walsh code (out of 64 or 128, or other appropriate number as used in the system) has been used to provide the deep paging channels, leaving more codes for use in forming the regular paging or traffic channels.

The proposed technique takes advantage of the existing code generation process and uses one of the Walsh sequences conventionally employed in forming a paging channel to create a much longer "auxiliary" Walsh sequence, and then forms a paging channel 506 using that longer auxiliary Walsh sequence. For example, one can use the conventional Walsh sequence ($W_2^{64}$) that is normally used for paging channel 506(1) to create a much longer "auxiliary" Walsh sequence, and then form a new or auxiliary paging channel using that longer auxiliary Walsh sequence.

As is well understood by a person skilled in the art, a Walsh sequence denoted $W_i^m$ (where i is the index of the Walsh sequence and m is the length of the Walsh sequence) can be used to generate N other Walsh sequences, referred to here as auxiliary sequences, each of length N*m, where N is a power of 2 (that is, $N=2^n$, n is a nonnegative integer). An auxiliary Walsh sequence is a Walsh sequence built by concatenating N times $W_i^m$, where each concatenated $W_i^m$ may have a different polarity. The sequence of polarity must be selected to generate N additional orthogonal Walsh sequences of length N*m.

Taking N equals 4 as an example, one can build the following four auxiliary Walsh sequences of length 4*m from $W_i^m$:

$$W_i^m W_i^m W_i^m W_i^m; \quad (1)$$

$$\overline{W_i^m} W_i^m \overline{W_i^m} W_i^m; \quad (2)$$

$$\overline{W_i^m} \overline{W_i^m} W_i^m W_i^m; \text{ and} \quad (3)$$

$$W_i^m \overline{W_i^m} \overline{W_i^m} W_i^m. \quad (4)$$

where $\overline{W_i^m}$ denotes the logical complement of $W_i^m$, that is $\overline{W_i^m} = -W_i^m$, and $W_i^1 = 1$.

Each of the N*m auxiliary Walsh sequences generated from $W_i^m$ is orthogonal to all other Walsh sequences of length m except for Walsh sequence $W_i^m$, and are orthogonal to each other.

Consequently, N auxiliary Walsh sequences of length N*64 can be formed from Walsh sequence $W_2^{64}$. Further, each of the N auxiliary Walsh sequences formed from Walsh sequence $W_2^{64}$ are orthogonal to each other, and all of the channels resulting from using these sequences will be orthogonal to the other channels, including those formed using other Walsh sequences $W_j^{64}$ ($j \neq 2$). Preferably, N is chosen to be 1024, which yields 1024 auxiliary Walsh sequences of length 65536 (1024*64=65536). Any one of these 1024 auxiliary Walsh sequences can be generated or formed from the code originally used for a paging channel, such as 506(1). Those skilled in the art will recognize that N can be set at other values, as desired, just as the orthogonal codes can be selected to have other lengths.

Generating one of 1024 auxiliary Walsh sequences of length 65536 with or from the sequence otherwise used in forming paging channel 506(1) allows one to lower the data rate of paging channel 506(1) from the conventional data rate of 4800 bps or 9600 bps to a data rate of 10 bps or less while "saving" orthogonal (Walsh) codes. Specifically, employing a Walsh sequence of length 65536 to form a paging channel 506(1) enables paging channel 506(1) to support a data rate as low as 9.375 bits per second. This results from the fact that each data bit is transmitted over a longer time period at a certain power level, and signal reception circuitry is set to accumulate more energy per bit in the incoming signal. This increases the ability to correlate with and demodulate the paging signal successfully in the presence of attenuation.

As discussed above, lowering the data rate of paging channel 506(1) to 10 bps or less, while using approximately the same amount of power as is conventionally used, enables paging channel 506(1) to deliver paging channel messages to a user who is in a building where the excess propagation loss that has to be overcome is in the range of 20 to 30 dB.

In addition to combining one of the 1024 auxiliary Walsh sequences with data used for paging channel 506(1), one of the other 1024 auxiliary Walsh sequences can be used to create an auxiliary sync or synchronization channel in addition to pilot channel 502 and sync channel 504. If the auxiliary sync channel is given the same power level as sync channel 504, then the auxiliary sync channel is able to overcome a 20–30 dB attenuation and, thus, penetrate buildings and other like obstructions. This provides an appropriate timing reference for use in acquiring and demodulating the deep paging signals. An auxiliary pilot channel, although not required, can also be used as desired. Here, one of the 1024 auxiliary Walsh sequences can be used to create an auxiliary pilot channel in addition to pilot channel 502.

Figure 6:
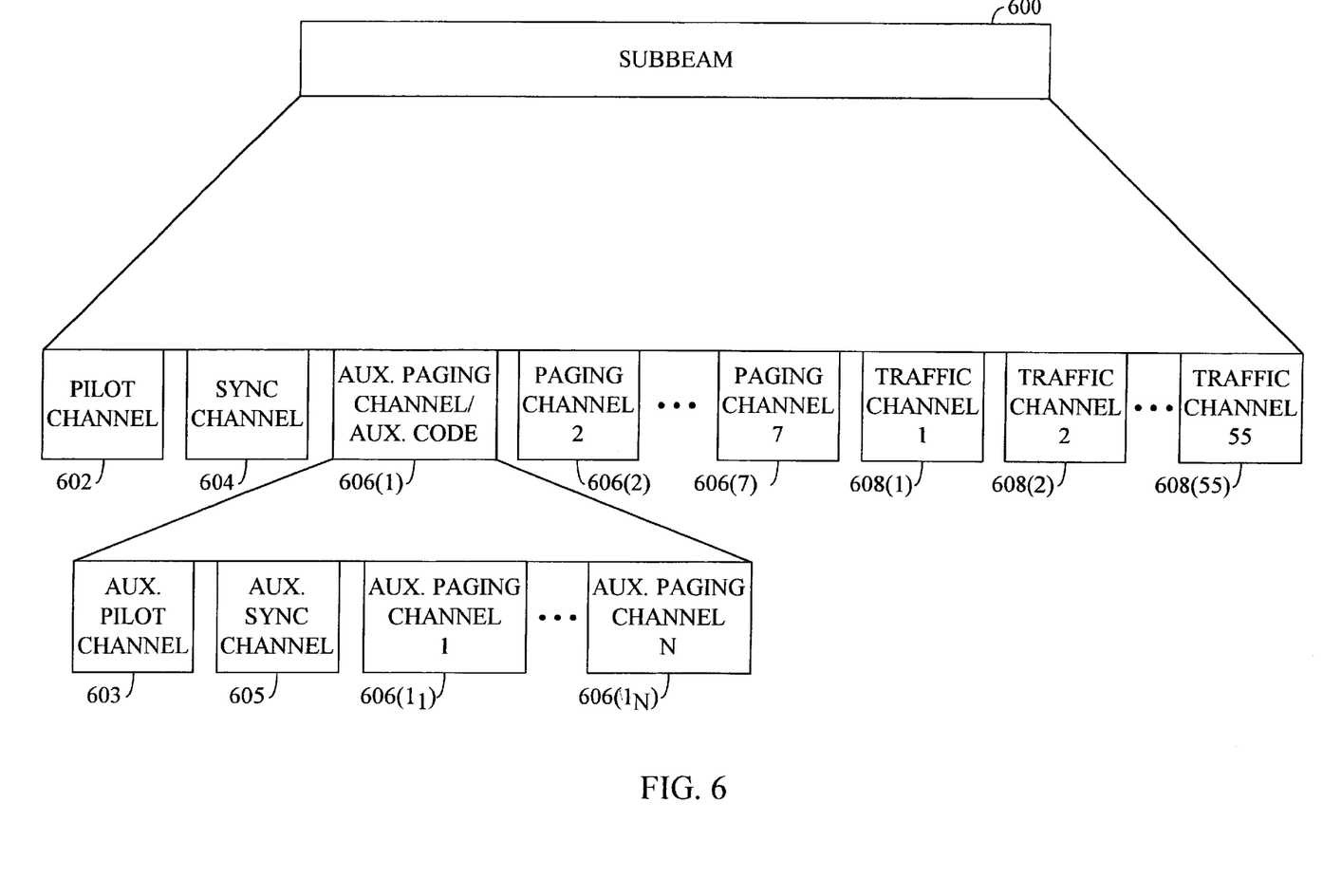
FIG. 6 illustrates a subbeam according to one embodiment.

FIG. 6 illustrates a subbeam 600 having a signal structure according to one embodiment of the present invention. Like subbeam 500, subbeam 600 includes a pilot channel 602, a sync channel 604, up to seven paging channels 606(1)–(7), including auxiliary paging channel 606(1), and fifty-five traffic channels 608(1)–(55). The orthogonal code (606(1)) used to create auxiliary paging channel 606(1), or 606($1_1$), can also be used to create up to 1024 or more auxiliary orthogonal, Walsh, codes which can be used for creating auxiliary pilot (if desired), additional auxiliary sync, and multiple auxiliary paging channels. This is shown in FIG. 6, where subbeam 600 includes an auxiliary pilot channel 603, auxiliary sync channel 605, and one or more auxiliary paging channels 606($1_1$) through 606($1_N$). As before, longer or shorter orthogonal sequences can be used as desired, according to the specific communication system design, which results in different number of channels as would be known.

In one embodiment, pilot channel 602 is generated or formed using Walsh sequence $W_0^{64}$, sync channel 604 is formed using Walsh sequence $W_1^{64}$, paging channels 606 (2)–606(8) are formed using Walsh sequences $W_3^{64}$–$W_8^{64}$, and traffic channels 608(1)–608(55) are formed using Walsh sequences $W_9^{64}$–$W_{63}^{64}$. In this embodiment, auxiliary paging channel 606(1), or 606($1_1$), is formed using one of 1024 auxiliary Walsh sequences of length 65536 that is formed from Walsh sequence $W_2^{64}$, as described above. Further, auxiliary synch channel 605 is created or formed using another one of the 1024 auxiliary Walsh sequences that is formed from Walsh sequence $W_2^{64}$.

Preferably, the data rate on auxiliary paging channel 606(1) is set to 10 bps or less as opposed to the conventional data rates of 4800 bps and 9600 bps. With this configuration, data transmitted on auxiliary sync channel 605 and auxiliary paging channel 606(1) is able to penetrate a structure (for example, a building) where the excess propagation loss is in the range of 30 dB or less, because of the increased energy captured per bit from longer signal integration times. Consequently, pages sent over auxiliary paging channel 606(1), or 606($1_1$), can be received by a user terminal regardless of whether or not the user terminal is inside a building.

However, because satellites 116, 118 are not in geosynchronous orbit with the Earth, lowering the data rate on auxiliary paging channel 606(1) to 10 bps or less exacerbates the Doppler effect. That is, the lower data transfer rate the higher the impact of Doppler frequency shifts and phase changes. The longer bit period at the lower frequency means that the resulting Doppler change and phase change over each bit is greater than compared to higher frequencies. For example, the Doppler change and phase change due to Doppler that occurs over each (one) bit when receiving signals at 10 bps is 1000 times greater than when receiving the same signals at 10,000 bps. This results in an inability, or at least decreased ability, to perform coherent signal reception, as is generally employed in communication systems using a pilot signal. The amount of this Doppler must be tracked and otherwise compensated for to allow proper signal timing for correlation and tracking.

Techniques can be used to compensate for the increased impact of Doppler at the lower frequencies, and two such techniques are discussed below. In the first technique, this actually presents less of a problem because the UT circuitry is effectively locked to Doppler before it begins receiving at the 10 bps rate. But, in the second proposed technique, the UT is turned-on when already inside the building or area of attenuation, and it has to search for a pilot using a relatively long (1000× as long) integration time. Without having a fairly good idea of what the Doppler value is, a UT is not likely to find or acquire the pilot or synch signals.

The first technique requires that a user terminal be turned on while being unobstructed. Next the user terminal is then placed in "deep paging mode" just prior to the user terminal entering a building or otherwise being obstructed. Placing a user terminal in deep paging mode means that the user terminal will monitor the regular or auxiliary pilot channel 603 using an increased integration period or time, monitor the regular or auxiliary synch channel 605, and also monitor the low data rate paging channel (auxiliary paging channel 606(1)). Preferably, an integration time that is on the order of 1000 times longer than usual (as compared to regular pilot, paging, traffic etc. signals) is used. As the user terminal enters the building, the user terminal automatically tracks the Doppler based on the low data rate channel and is, thus, using a long integration time enabling tracking with large path attenuations. Therefore, a UT is able to receive paging messages on the low data rate paging channel so long as the attenuation does not exceed 30 dB. The only drawback to this technique is that a user must remember to engage the deep paging mode before the user enters a building, or the user terminal must automatically detect signal attenuation and then automatically switch to deep paging mode.

The second technique is generally more expensive or uses more circuitry elements to implement than the first technique but does not require placing the user terminal into a deep paging mode prior to the user terminal entering a building or other area of severe attenuation. In fact, the second technique works even when the user terminal is turned on while the user terminal is already inside the area of attenuation, like inside a building. The second technique requires a user terminal to receive and store ephemeris messages transmitted from a gateway while in the normal mode. By receiving and storing ephemeris messages, the user terminal will know or can determine expected Doppler frequency shifts for the various satellites and their evolution in time.

To use the second technique the user terminal must also know its location. It is generally sufficient for a user terminal to store a location when it registers with a gateway, and use the last stored position if a new position is not otherwise available. Alternatively, the location of user terminal can be determined if the user terminal is equipped with a global positioning system (GPS) receiver that can acquire GPS signals while inside a building. The GPS data is then used as a starting location. Knowing its location and receiving and storing the ephemeris messages enables the user terminal to determine the Doppler and project future values. Thus, the second technique enables user terminal to be turned on while inside a building and still acquire pilot channel 600.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What I claim as my invention is:

1. A method for deep paging with a paging channel message in a communication system in which communication channels are generated using a set of orthogonal binary sequences of pre-selected length m and data is transferred at a minimum data rate or D bits per second, comprising the steps of:

forming at least one deep paging channel using an additional orthogonal sequence of length Nm, N being a positive integer, generated from one of said set of orthogonal sequences: and, transmitting said paging channel message on said deep paging channel at a data rate of less than D bits per second, wherein said orthogonal binary sequences are Walsh sequences of length 64 or less, and said additional orthogonal binary sequence is an additional Walsh sequence having a length greater than or equal to 128.

2. The method of claim 1, wherein said additional Walsh sequence has a length of 65536 chips.

3. The method of claim 1, wherein said additional Walsh sequence is an auxiliary Walsh sequence.

4. The method of claim 1, wherein said data rate is less than 10 bits per second.

5. The method of claim 1, further comprising the step of creating at least a second auxiliary orthogonal sequence from said one of said plurality of orthogonal sequences.

6. The method of claim 5, further comprising the step of combining synchronization channel information with said second auxiliary orthogonal sequence, thereby creating an auxiliary sync channel.

7. The method of claim 1, further comprising the step of creating additional deep paging channels using additional orthogonal sequences of length Nm, N being a positive integer, generated from said one of said set of orthogonal sequences.

8. The method of claim 1, further comprising the step of creating additional deep paging channels using additional orthogonal sequences of length Nm, N being a positive integer, generated from others of said set of orthogonal sequences.

9. A method for deep paging with a paging channel message in a communication system in which communication channels are generated using a set of orthogonal binary sequences of pre-selected length m and data is transferred at a minimum data rate or D bits per second, comprising the steps of:

forming at least one deep paging channel using an additional orthogonal sequence of length Nm, N being a positive integer, generated from one of said set of orthogonal sequences; and, transmitting said paging channel message on said deep paging channel at a data rate of less than D bits per second, wherein said orthogonal binary sequences are Walsh sequences of length 128 or less, and said additional orthogonal binary sequence is an additional Walsh sequence having a length greater than or equal to 256.

10. The method of claim 9, wherein said data rate is less than 10 bits per second.

11. The method of claim 9, further comprising the step of creating at least a second auxiliary orthogonal sequence from said one of said plurality of orthogonal sequences.

12. The method of claim 9, further comprising the step of creating additional deep paging channels using additional orthogonal sequences of length Nm, N being a positive integer, generated from said one of said set of orthogonal sequences.

13. The method of claim 9, further comprising the step of creating additional deep paging channels using additional orthogonal sequences of length Nm, N being a positive integer, generated from others of said set of orthogonal sequences.

14. A method for deep paging with a paging channel message in a CDMA communication system wherein a plurality of Walsh sequences are used to form a plurality of orthogonal channels, comprising the steps of:

creating at least one auxiliary Walsh sequence from one of said plurality of Walsh sequences, wherein said auxiliary Walsh sequence has a length of 65536 chips;

forming a paging channel with said auxiliary Walsh sequence and said paging channel message; and transmitting said paging channel message over said paging channel at a data rate of less than 4800 bits per second.

15. The method of claim 14, wherein said data rate is less than 10 bits per second.

16. The method of claim 14, further comprising the step of creating at least a second auxiliary Walsh sequence from said one of said plurality of Walsh sequences.

17. The method of claim 16, further comprising the step of combining synchronization channel information with said second auxiliary Walsh sequence, thereby creating an auxiliary sync channel.

18. The method of claim 16, further comprising the step of creating additional auxiliary Walsh sequences from said one of said plurality of Walsh sequences and forming additional deep paging channels using said additional auxiliary Walsh sequences.

* * * * *